United States Patent [19]

Miyata et al.

[11] 3,945,837

[45] Mar. 23, 1976

[54] INK COMPOSITION

[75] Inventors: Fumio Miyata, Kyoto; Yasuji Okuda, Hirakata, both of Japan

[73] Assignee: Sakura Color Products Corporation, Osaka, Japan

[22] Filed: July 12, 1973

[21] Appl. No.: 378,389

[30] Foreign Application Priority Data
July 15, 1972   Japan................................. 47-71144
Sept. 28, 1972   Japan................................. 47-97828

[52] U.S. Cl. ....................... 106/22; 106/27; 106/30; 260/37 NP
[51] Int. Cl.².................... C09D 11/02; C09D 11/08
[58] Field of Search .............................. 106/21–23, 106/27, 30; 96/62; 117/36.7, 36.8, 36.9, 1.7; 260/37 NP

[56] References Cited
UNITED STATES PATENTS
2,567,963   9/1951   Petke ..................................... 106/22
3,748,136   7/1973   Willems ............................. 96/62 X

OTHER PUBLICATIONS

Apps, Printing Ink Technology, Leonard Hill (Books) Ltd., London, pp. 148, 175–177.
Lion Oil and Fat Co. Ltd., Printing Ink Compn. for Non–Polar Materials, EG, Polyethylene (JA–006030...S29), JA–712 6131–R; 11–27–65.

*Primary Examiner*—Lorenzo B. Hayes
*Attorney, Agent, or Firm*—Toren, McGeady and Stanger

[57] ABSTRACT

An ink composition which comprises an alicyclic hydrocarbon solvent having dissolved therein a resinous binder and a modified dye, said modified dye being at least one species selected from the group consisting of a reaction product obtained by reacting a dye having at least one group of $-CO_2M$ and $-SO_3M$ in the molecule wherein M is an alkali metal with an organic ammonium compound and a reaction product obtained by reacting a basic dye with an acid compound.

24 Claims, No Drawings

INK COMPOSITION

The present invention relates to ink compositions, more particularly to an ink composition especially suitable for a marking pen.

Presently, inks prepared by dissolving an oil-soluble dye and resin in xylene are mainly employed for marking pens which are extensively used at home, school, office, etc. as writing and drawing implements. However, xylene has the objections of: (1) giving off a vapor having a strong odor to intensely stimulate the eyes, nose and throat, (2) causing troubles in the marrow when inhaled over a prolonged period of time even in a very small amount, and (3) producing dermatitis when xylene contacts the skin repeatedly. For this reason, it has been desired to provide an ink for marking pens (hereinafter referred to briefly as "ink" unless otherwise specified) prepared by using a solvent of weak odor and low toxicity. In fact, inks have recently become available which are prepared by dissolving an oil- or alcohol-soluble dye and resin in methyl cellosolve of a low odor. Although methyl cellosolve is weak in odor, it is as toxic as xylene and involves the hazard that the vapor of the ink will be inhaled by the user or the ink will contact his skin. Thus the ink proposed has not overcome the objections heretofore experienced. Furthermore, when a drawing or writing is made on paper or the like with the conventional ink, the dye continues to sublime from the ink-deposited portion even after the ink has been dried, with the result that the color transfers to paper, cloth or the like which comes into contact with the inked portion, which is turn undergoes fading.

It is known that an alicyclic hydrocarbon solvent is weak in odor and much lower than xylene or cellosolve in toxicity to the human body, but the use of this solvent is infeasible inasmuch as at present there is no dye available that is soluble therein to a concentration required for the ink.

Accordingly, a main object of this invention is to provide a dye which is readily soluble in a substantially odorless and nontoxic alicyclic hydrocarbon solvent to a high concentration.

Another object of this invention is to provide a dye which will not sublime from the ink-deposited portion after it has been dried.

Another object of this invention is to provide an ink which is low in odor and toxicity such that it will not adversely affect the human body even when used over a long period of time.

Still another object of this invention is to provide an ink having a high concentration of dye and excellent in tinctorial properties.

Other objects and features of this invention will become more apparent from the following description.

The present invention provides an ink composition which comprises an alicyclic hydrocarbon solvent having dissolved therein a resinous binder and a modified dye, said modified dye being at least one species selected from the group consisting of a reaction product obtained by reacting a dye having at least one group of —CO$_2$M and —SO$_3$M in the molecule wherein M is an alkali metal with an organic ammonium compound and a reaction product obtained by reacting a basic dye with an acid compound: said ammonium compound being represented by the formula

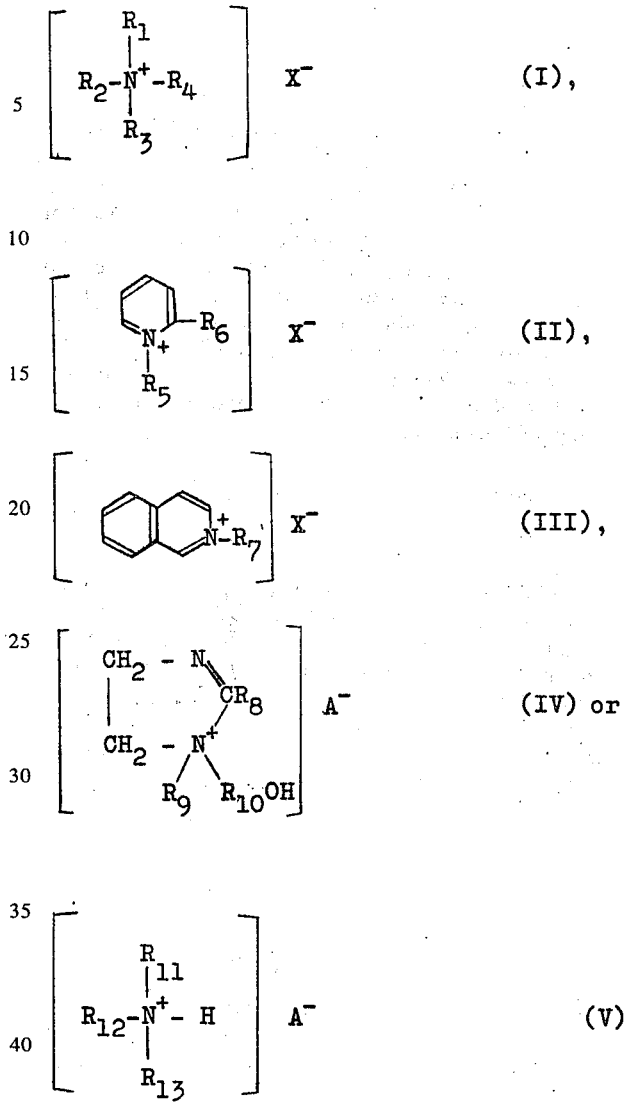

wherein $R_1$, $R_2$, $R_3$ and $R_4$ are respectively a saturated or unsaturated hydrocarbon radical having 1 to 40 carbon atoms, a radical of a saturated or unsaturated hydrocarbon bonded to a saturated or unsaturated hydrocarbon by a divalent group of —O—, —S—, —COO—, —CONH— or —NH—, the total carbon number of both hydrocarbons bonded being in the range of 2 to 40, or

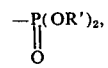

R' being an alkyl or alkenyl having 1 to 20 carbon atoms, provided that at least one of $R_1$, $R_2$, $R_3$ and $R_4$ has a carbon number of not lower than 4 and the total carbon number of $R_1$, $R_2$, $R_3$ and $R_4$ is in the range of 7 to 55; $R_5$ is a saturated or unsaturated hydrocarbon radical having 4 to 40 carbon atoms, a radical of a saturated or unsaturated hydrocarbon bonded to a saturated or unsaturated hydrocarbon by a divalent group of —O—, —S—, —COO—, —CONH— or —NH—, the total carbon number of both hydrocarbons bonded being in the range of 4 to 40, or

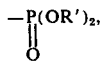

R' being an alkyl or alkenyl having 4 to 20 carbon atoms; $R_6$ is hydrogen atom, methyl or ethyl group; $R_7$ is an aliphatic hydrocarbon radical having 4 to 22 carbon atoms; $R_8$ and $R_9$ are respectively a hydrocarbon radical having 1 to 10 carbon atoms; $R_{10}$ is methyl, ethyl, butyl or propyl; $R_{11}$, $R_{12}$ and $R_{13}$ are respectively a hydrogen atom, a hydrocarbon radical having 1 to 40 carbon atoms, a radical of a hydrocarbon bonded to a hydrocarbon by a divalent group of —O—, —S—, —COO—, —CONH— or —NH—, the total carbon number of both hydrocarbons bonded being in the range of 2 to 40, or

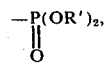

R' being an alkyl or alkenyl having 1 to 20 carbon atoms, provided that at least one of $R_{11}$, $R_{12}$ and $R_{13}$ is a radical having a carbon number of not lower than 4 and the total carbon number of $R_{11}$, $R_{12}$ and $R_{13}$ is in the range of 4 to 50; X is halogen atom and; A is an acid residue; and said acid compound, being represented by the formula

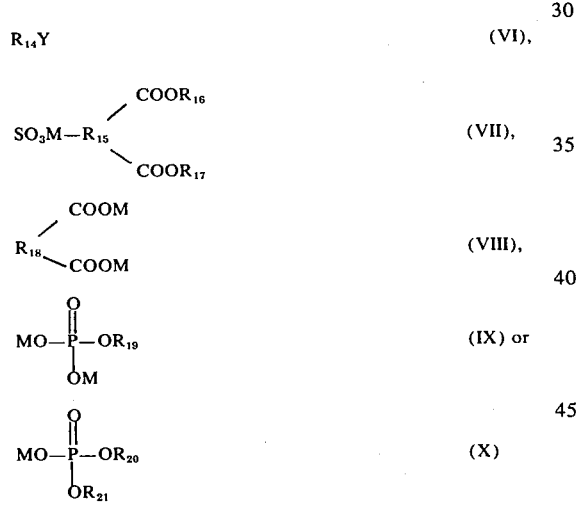

wherein $R_{14}$ and $R_{19}$ are respectively a saturated or unsaturated aliphatic hydrocarbon radical having 7 to 22 carbon atoms, an aromatic hydrocarbon radical having 10 to 28 carbon atoms or a saturated or unsaturaated alicyclic hydrocarbon radical having 10 to 28 carbon atoms; $R_{15}$ is a saturated aliphatic hydrocarbon radical having 2 to 14 carbon atoms; $R_{16}$, $R_{17}$, $R_{20}$ and $R_{21}$ are respectively a saturated or unsaturated aliphatic hydrocarbon radical having 4 to 22 carbon atoms; $R_{18}$ is a saturated aliphatic hydrocarbon radical having 4 to 18 carbon atoms; M is an alkali metal or ammonium; Y is a —$CO_2M$—, —$SO_3M$—, or —$OSO_3M$— group wherein M is the same as above.

According to the researches of the present inventor it has been found that a modified dye obtained in accordance with the present invention is soluble in an alicyclic hydrocarbon solvent to a very high concentration, making it possible to obtain an ink of deep color without using xylene, cellosolve or like solvent which is detrimental to the human body. The reason why the reaction product described above is highly soluble in an alicyclic hydrocarbon solvent has not been fully clarified yet.

Further this invention assures greatly reduced sublimation of dye from the inked portion after the ink has been dried, consequently eliminating the transfer of color to paper, cloth or the like which will contact the inked portion and permitting hardly any fading of color in the inked portion over a long period of time.

The dyes to be used according to this invention having at least one of —$CO_2M$ groups and —$SO_3M$ groups wherein M is as defined above include various dyes such as monoazo dyes, disazo dyes, trisazo dyes, polyazo dyes, anthraquinone dyes, triphenylmethane dyes, xanthen dyes, stilbene dyes and indigo dyes. These dyes are used singly or in combination with one another.

Examples of dyes having at least one of —$CO_2M$ and —$SO_3M$ groups are shown below, all of which are indicated in accordance with Color Index (2nd ed.) compiled and published jointly by The American Association of Textile Chemist and Colorists and The Society of Dyers and Colourists of Great Britain:

1. Monoazo dyes:

Direct Yellow 8, 27, 28,
Acid Yellow 11, 17, 23, 25, 29, 36, 40, 76, 98, 99,
Direct Red 20,
Acid Red 1, 6, 8, 9, 13, 14, 18, 26, 27, 32, 35, 37, 42, 133, 155, 180, 183, 184, 186, 198, 249, 265,
Acid Blue 92, 117, 158, 161,
Direct Orange 39, 41,
Acid Orange 1, 7, 8, 10, 19, 20, 28, 41, 78,
Acid Violet 7, 11,
Acid Green 12, 35,
Acid Brown 2, 4, 20,
Acid Black 51, 52, 107.

2. Disazo dyes:

Direct Yellow 1, 12, 24, 33, 44,
Acid Yellow 38, 42, 44,
Direct Red 1, 2, 4, 13, 17, 23, 24, 28, 31, 33, 37, 39, 44, 46, 62, 63, 75, 79, 81, 83, 229,
Acid Red 85, 89, 97, 111, 114, 115, 134, 145, 154, 158, No. 26670,
Direct Blue 1, 2, 6, 15, 22, 25, 76, 90, 98, 158, 165, 168, 226,
Acid Blue 29, 113, 120, 123,
Direct Black 17, 51,
Acid Orange 24, 33, 45, 51, 56,
Direct Violet 1, 7, 9, 12, 22, 35, 48, 51, 63,
Acid Green 19, 20,
Acid Brown 14,
Direct Orange 1, 6, 8, 10, 26, 29, 49, 102,
Direct Brown 2, 58, 59,
Acid Black 1, 7, 24, 26, No. 20510.

3. Trisazo dyes:

Direct Blue 71, 78, 120, 163,
Direct Green 1, 6, 8, 33, 59,
Direct Brown 1A, 6, 27, 95, 101, 173,
Acid Black 94.

4. Polyazo dyes:

Direct Yellow 60,
Direct Red 32, 80, 84, 194,
Direct Blue 131, 150, 159, 162, 175, 176, Direct Brown 13, 14, 31, 33, 39, 43, 44, 63, 70, 73, 74, 100, 127, 149, 150, 215,
Acid Brown 25, 92, 106, 119, 120, 123,
Direct Black 19, 22, 28, 32, 34, 75, 76, 77, 97, 100, 112.

5. Anthraquinone dyes:

Acid Red 80, 82, 83,
Acid Blue 23, 25, 27, 40, 41, 43, 45, 67, 78, 80, 138,
Acid Violet 34, 41, 43, 51, No. 62000,
Acid Green 25, 27, 36, 41, 44,
Acid Brown 27,
Acid Black 48.

6. Triphenylmethane dyes:

Acid Blue 1, 7, 9, 15, 22, 83, 90, 93, 100, 103, 104,
Direct Blue 41,
Acid Violet 15, 49,
Acid Green 3, 9, 16.

7. Xanthene dyes:

Acid Yellow 73, 74,
Acid Red 51, 52, 87, 91, 92, 93, 94, 95, 98,
Acid Blue 19,
Acid Violet 9.

8. Stilbene dyes:

Direct Yellow 11, 39.

9. Indigo dyes:

Acid Blue 74.

Among these dyes, preferable are those having one to two —$CO_2M$ groups, one to two —$SO_3M$ groups or both —$CO_2M$ group and —$SO_3M$ group wherein M is sodium.

The organic ammonium compounds to be reacted with the dyes having at least one group of —$CO_2M$ and —$SO_3M$ according to this invention are represented by the formulas (I), (II), (III), (IV) and (V) and used singly or in combination with one another. Typical of the organic ammonium compounds to be used in this invention are shown in Tables 1 – 5 below:

I. Examples of quaternary ammonium halides represented by the formula (I) are shown in Table 1:

Table 1

| Compound No. | Name of organic ammonium compound |
|---|---|
| (1) | Butyl triethyl ammonium halide |
| (2) | Hexyl triethyl ammonium halide |
| (3) | Octyl tributyl ammonium halide |
| (4) | Decyl tripropyl ammonium halide |
| (5) | Dodecyl triethyl ammonium halide |
| (6) | Tetradecyl trimethyl ammonium halide |
| (7) | Hexadecyl trimethyl ammonium halide |
| (8) | Octadecyl trimethyl ammonium halide |
| (9) | Docosyl trimethyl ammonium halide |
| (10) | Hexacosyl trimethyl ammonium halide |
| (11) | Triacontyl trimethyl ammonium halide |
| (12) | Hexacontyl trimethyl ammonium halide |
| (13) | Octadecenyl triethyl ammonium halide |
| (14) | Didodecyl diethyl ammonium halide |
| (15) | Ditetradecyl diethyl ammonium halide |
| (16) | Dihexadecyl dimethyl ammonium halide |
| (17) | Octadecyl octadecenyl dimethyl ammonium halide |
| (18) | Hexadecyl octadecyl dimethyl ammonium halide |
| (19) | Trioctyl ethyl ammonium halide |
| (20) | Tridecyl methyl ammonium halide |
| (21) | Didodecyl hexadecyl methyl ammonium halide |
| (22) | Dioctadecyl octyl methyl ammonium halide |
| (23) | Dodecylamidomethyl triethyl ammonium halide |
| (24) | Hexadecylamidopropyl trimethyl ammonium halide |
| (25) | Tetradecylaminomethyl trimethyl ammonium halide |

Table 1-continued

| Compound No. | Name of organic ammonium compound |
|---|---|
| (26) | Hexacosylaminomethyl dimethyl ammonium halide |
| (27) | Lauroylethyl octyl dimethyl ammonium halide |
| (28) | Stearoylmethyl octyl dimethyl ammonium halide |
| (29) | Oleyloxibutyl trimethyl ammonium halide |
| (30) | Octylthioethyl trimethyl ammonium halide |
| (31) | Didodecylphosphoryl trimethyl ammonium halide |
| (32) | dioleylphosphoryl triethyl ammonium halide |
| (33) | Oxistearyl trimethyl ammonium halide |
| (34) | Dodecylchlorobenzyl trimethyl ammonium halide |
| (35) | Hexadecyl aminopropyl dimethyl ammonium halide |
| (36) | Octylbenzyl trimethyl ammonium halide |
| (37) | Dodecylbenzyl trimethyl ammonium halide |
| (38) | Hexadecylbenzyl trimethyl ammonium halide |
| (39) | Butylcyclohexyl trimethyl ammonium halide |
| (40) | Octylcyclohexyl trimethyl ammonium halide |
| (41) | Octylnaphtyl trimethyl ammonium halide |
| (42) | Didecylbenzyl dimethyl ammonium halide |
| (43) | Decyl octylbenzyl dimethyl ammonium halide |
| (44) | Dodecyl hexyl cyclohexyl ammonium halide |

II. Examples of pyridinium halides represented by the formula (II) are shown in Table 2 below:

Table 2

| Compound No. | Name of organic ammonium compound |
|---|---|
| (45) | N-butyl pyridinium halide |
| (46) | N-octyl pyridinium halide |
| (47) | N-decyl pyridinium halide |
| (48) | N-dodecyl pyridinium halide |
| (49) | N-dodecyl methyl pyridinium halide |
| (50) | N-tetradecyl pyridinium halide |
| (51) | N-hexadecyl pyridinium halide |
| (52) | N-octadecyl pyridinium halide |
| (53) | N-docosyl pyridinium halide |
| (54) | N-hexacosyl pyridinium halide |
| (55) | N-triacosyl pyridinium halide |
| (56) | N-hexacontyl pyridinium halide |
| (57) | N-octadecylamidomethyl pyridinium halide |
| (58) | N-hexadecylamidopropyl pyridinium halide |
| (59) | N-tetradecylaminomethyl pyridinium halide |
| (60) | N-tetradecylaminomethyl ethyl pyridinium halide |
| (61) | N-methyl-N-octadecenylaminomethyl pyridinium halide |
| (62) | N-Lauroylethyl pyridinium halide |
| (63) | N-stearoylmethyl pyridinium halide |
| (64) | N-octadecenyloxibutyl pyridinium halide |
| (65) | N-hexadecenylthioethyl pyridinium halide |
| (66) | N-didodecyloxiphosphoryl pyridinium halide |
| (67) | N-decylbenzyl pyridinium halide |
| (68) | N-octadecylbenzyl pyridinium halide |
| (69) | N-hexadecylcyclohexyl pyridinium halide |
| (70) | N-dodecylcyclohexyl pyridinium halide |

III. Examples of quinolinium compounds represented by the formula (III) are shown in Table 3 below:

Table 3

| Compound No. | Name of organic ammonium compound |
|---|---|
| (71) | N-octyl quinolinium chloride |
| (72) | N-heptadecyl quinolinium chloride |

IV. Examples of imidazolinium compounds represented by the formula (IV) are shown in Table 4 below:

Table 4

| Compound No. | Name of organic ammonium compound |
|---|---|
| (73) | 1-Ethyl-1-hydroxyethyl-2-heptadecyl-imidazolinium diethylsulphate |
| (74) | 1-Methyl-1-hydroxymethyl-2-tridecyl- |

Table 4-continued

| Compound No. | Name of organic ammonium compound |
|---|---|
| | imidazolinium chloride |

V. Examples of organic and inorganic acid salts of primary, secondary and tertiary amines represented by the formula (V) are acid salts such as hydrochlorides, formates, acetates, lactates etc., which are shown in Table 5 below:

Table 5

| Compound No. | Name of organic ammonium compound |
|---|---|
| (75) | Butyl amine hydrochloride |
| (76) | Hexyl amine hydrochloride |
| (77) | Octyl amine hydrochloride |
| (78) | Decyl amine hydrochloride |
| (79) | dodecyl amine hydrochloride |
| (80) | Octadecyl amine hydrochloride |
| (81) | docosyl amine hydrochloride |
| (82) | Triacontyl amine hydrochloride |
| (83) | Octylbenzyl amine hydrochloride |
| (84) | Hexylbenzyl amine hydrochloride |
| (85) | Hexadecylamidopropyl amine hydrochloride |
| (86) | Tetradecylaminomethyl amine hydrochloride |
| (87) | Octadecenyloxibutyl amine hydrochloride |
| (88) | Hexadecylthioethyl amine hydrochloride |
| (89) | Didecylphosphoryl amine hydrochloride |
| (90) | Tetradecyl amine sulphate |
| (91) | Decylcyclohexyl amine sulphate |
| (92) | Hexacontyl amine nitrate |
| (93) | Dodecylcyclohexenyl amine nitrate |
| (94) | Octadecenyl amine phosphate |
| (95) | Hexadecyl amine acetate |
| (96) | Octadecenylamidomethyl amine acetate |
| (97) | Hexacosyl amine lactate |
| (98) | Lauroylethyl amine lactate |
| (99) | Dibutyl amine acetate |
| (100) | Hexadecyl ethyl amine hydrochloride |
| (101) | Hexyl methyl amine hydrochloride |
| (102) | Hexadecyl methyl amine hydrochloride |
| (103) | Didecyl amine hydrochloride |
| (104) | Dihexylbenzyl amine hydrochloride |
| (105) | Dibutylcyclohexyl amine hydrochloride |
| (106) | Dioctadecyl amine formate |
| (107) | Octyl butyl amine acetate |
| (108) | Dodecyl propyl amine acetate |
| (109) | Butyl diethyl amine hydrochloride |
| (110) | Octyl propyl ethyl amine hydrochloride |
| (111) | Octadecyl dimethyl amine hydrochloride |
| (112) | Tridecyl amine hydrochloride |
| (113) | Dodecyl ethyl methyl amine acetate |
| (114) | Octyl propyl ethyl amine acetate |

Among these typical organic ammonium compounds, particularly advantageous are: (a) quaternary ammonium ammonium chlorides represented by the formula (I) above, (b) pyridinium chlorides represented by the formula (II) above, (c) quinolinium chlorides represented by the formula (III) above, (d) imidazolinium chlorides represented by the formula (IV) above and (e) primary, secondary and tertiary amine hydrochlorides represented by the formula (V) above.

The basic dyes to be used according to this invention have a positively charged nitrogen, sulphur or oxygen atom in the molecule and include various dyes such as azo dyes, diphenylmethane dyes, triarylmethane dyes, xanthene dyes, acridine dyes, methine or polymethine dyes, thiazole dyes, azine dyes, oxazine dyes and thiazine dyes. These dyes can be used singly or in combination with one another.

Examples of the basic dyes are shown below in accordance with Color Index.

1. Azo dyes:

Basic Yellow 32, 34, 36,
Basic Orange 1, 2, 32, 33, 34,
Basic Red 17, 18, 23, 24, 32, 34, 38, 39, 40,
Basic Violet 26, 28,
Basic Blue 58, 59, 64, 65, 66, 67, 68, 91, 98,
Basic Brown 1, 2, 4, 11, 12,
Basic Black 2, 8.

2. Diphenylmethane dyes:

Basic Yellow 2, 3.

3. Triarylmethane dyes:

Basic Red 9,
Basic Violet 1, 2, 3, 4, 13, 14,
Basic Blue 1, 5, 7, 11, 19, 26,
Basic Green 1, 4.

4. Xanthene dyes:

Basic Red 1,
Basic Violet 10, 14.

5. Acridine dyes:

Basic Yellow 9,
Basic Orange 10, 14, 15.

6. Methine or polymethine dyes:

Basic Yellow 11, 14, 21, 28, 33, 35,
Basic Orange 21, 22,
Basic Violet 7, 15, 21, 27,
Basic Red 13, 14, 15, 27, 35, 36, 37.

7. Thiazole dyes:

Basic Yellow 1.

8. Azine dyes:

Basic Red 2,
Basic Violet 5,

9. Oxazine dyes:

Basic Blue 3, 6, 12.

10. Thiazine dyes:

Basic Blue 9, 24, 25,
Basic Green 5.

11. Triphenylmethane dyes:

Basic Green 4.

12. Quinoline dyes:

Basic Green 6.

13. Anthraquinone dyes:

Basic Violet 21, 22, 25,
Basic Blue 44, 45, 47, 60.

The acid compounds to be reacted with the basic dyes according to this invention are represented by the formulas (VI), (VII), (VIII), (IX) and (X) and can be used singly or in combination with one another. Typical of these acid compounds to be used in this invention are shown in Tables 6 – 10.

(I) Examples of alkali metal salts and ammonium salts represented by the formula (VI) are shown in Table 6:

Table 6

| Compound No. | Name of acid compound |
|---|---|
| (115) | Sodium caprylate |
| (116) | Potassium laurate |
| (117) | Ammonium myristate |
| (118) | Potassium myristate |
| (119) | Ammonium palmitate |

Table 6-continued

| Compound No. | Name of acid compound |
|---|---|
| (120) | Potassium palmitate |
| (121) | Sodium palmitate |
| (122) | Ammonium stearate |
| (123) | Potassium stearate |
| (124) | Sodium stearate |
| (125) | Sodium behenate |
| (126) | Ammonium oleate |
| (127) | Potassium oleate |
| (128) | Sodium oleate |
| (129) | Sodium butylbenzenesulfonate |
| (130) | Sodium hexylbenzenesulfonate |
| (131) | Sodium octylbenzenesulfonate |
| (132) | Sodium decylbenzenesulfonate |
| (133) | Sodium dodecylbenzenesulfonate |
| (134) | Sodium hexadecylbenzenesulfonate |
| (135) | Sodium butylnaphthalenesulfonate |
| (136) | Potassium hexylnaphtalenesulfonate |
| (137) | Sodium rhodinate |
| (138) | Ammonium rhodinate |
| (139) | Sodium naphthenate |
| (140) | Ammonium naphthenate |
| (141) | Potassium naphthenate |
| (142) | Sodium laurylsulfate |
| (143) | Potassium laurylsulfate |
| (144) | Sodium cetylsulfate |
| (145) | Potassium cetylsulfate |
| (146) | Sodium oleylsulfate |
| (147) | Potassium oleylsulfate |

II. Examples of alkali metal salts and ammonium salts represented by the formula (VII) are shown in Table 7.

Table 7

| Compound No. | Name of acid compound |
|---|---|
| (148) | Dibutyl sodium sulfoadipate |
| (149) | Dibutyl ammonium sulfoadipate |
| (150) | Dioctyl sodium sulfoadipate |
| (151) | Didodecyl sodium sulfoadipate |
| (152) | Dihexyl potassium sulfosuccinate |
| (153) | Didodecyl sodium sulfosuccinate |
| (154) | Dioctadecyl sodium sulfosuccinate |

III. Examples of alkali metal salts and ammonium salts represented by the formula (VIII) are shown in Table 8.

Table 8

| Compound No. | Name of acid compound |
|---|---|
| (155) | Sodium adipate |
| (156) | Sodium suberate |
| (157) | Potassium sebacate |
| (158) | Sodium sebacate |
| (159) | Ammonium sebacate |
| (160) | Sodium azelate |

IV. Examples of alkali metal salts and ammonium salts represented by the formula (IX) are shown in Table 9.

Table 9

| Compound No. | Name of acid compound |
|---|---|
| (161) | Monooctyl potassium phosphate |
| (162) | Monododecyl sodium phosphate |
| (163) | Monohexadecyl potassium phosphate |
| (164) | Monobehenyl sodium phosphate |

V. Examples of alkali metal salts and ammonium salts represented by the formula (X) are shown in Table 10.

Table 10

| Compound No. | Name of acid compound |
|---|---|
| (165) | Dibutyl sodium phosphate |
| (166) | Dibutyl ammonium phosphate |
| (167) | Dioctyl sodium phosphate |
| (168) | Didoecyl potassium phosphate |
| (169) | Dihexadecyl sodium phosphate |

Among these acid compounds exemplified above, particularly preferable are sodium salts of the compounds represented by the formulas (VI), (VII), (VIII), (IX) and (X).

The modified dye of the present invention can be prepared by the reaction of a dye having at least one of $CO_2M$ groups and $SO_3M$ groups with an organic ammonium compound represented by the formula (I), (II), (III), (IV) or (V) and by the reaction of a basic dye having a positively charged nitrogen, sulphur or oxygen atom in the molecule with an acid compound represented by the formula (VI), (VII), (VIII), (IX) or (X). The reaction can be conducted in water or organic solvent with stirring at a temperature from about 20° to about 70°C, preferably of about 40° to 50°C. The resultant reaction mixture is washed with water to separate the modified dye, followed by drying. The organic ammonium compound represented by the formula (I), (II), (III), (IV) or (V), or the acid compound represented by the formula (VI), (VII), (VIII), (IX) or (X) is used in an amount of at least one mole per mole of the dye. When the dye contains two or more substituents represented by —$CO_2M$ and/or $SO_3M$, the compound can be employed in such an amount that at least one of the above substituents contained in the dye molecule is reacted with the compound. Examples of the organic solvents used in the reaction to prepare the modified dye are alcohols, ketones, ethers, esters, aromatic solvents, aliphatic hydrocarbons, alcyclic hydrocarbons, etc., among which preferable are alcohols, ketones and ethers. The above reaction of dye with compound can be conducted prior to or simaltaneously with the preparation of the present ink composition. In the latter case it is preferable to first dissolve a resinous binder in an alicyclic hydrocarbon serving as a solvent for the ink composition and thereafter to add the dye and compound thereto for the reaction conducted in the same manner as above.

The resultant modified dye has a structure in which at least one of —$CO_2M$ and/or $SO_3M$, or a positively charged nitrogen, sulphur or oxygen atom contained in the molecule is reacted with one mole of the organic ammonium compound or the acid compound, is insoluble in water but soluble in alicyclic and aliphatic hydrocarbons, and has the same color as the original dye.

The alicyclic hydrocarbon solvents to be used in this invention which may differ with the type of the dye used, the desired concentration of ink, etc. are preferably those boiling at about 75° to 180°C from the viewpoint of preservability of ink over a prolonged period of time and drying speed after drawing or writing. Such solvents can be used alone or in admixture with one another and typical examples thereof are:

I. Hydrocarbons of cyclohexane series: cyclohexane, methylcyclohexane, ethylcyclohexane, dimethylcyclohexane, methylethylcyclohexane, butylcyclohexane, ethylbutylcyclohexane, isopropylcyclohexane, etc.

II. Hydrocarbons of cyclohexene series: ethylcyclohexene, butylcyclohexene, isopropylcyclohexene, pentylcyclohexene, etc.

In the present invention, at least one of aliphatic hydrocarbon solvents can be added to the alicyclic hydrocarbon solvent in an amount up to 300% by weight, based on the weight of the alicyclic hydrocarbon solvent. Such aliphatic hydrocarbon solvents preferably have a boiling point of about 75° to 180°C and include:

I. Hydrocarbons of methane series: heptane, octane, nonane, decane and like normal paraffins, isooctane and like isoparaffins, II. Hydrocarbons of ethylene series: 1-heptene, 1-octene, 1-nonene, etc.

III. Ligroin, petroleum spirit, refined gasoline and like aliphatic hydrocarbon solvent mixture.

Further, at least one of monohydric aliphatic alcohols having 2 to 20 carbon atoms and dihydric aliphatic alcohols having 2 to 100 carbon atoms can be added to the alicyclic hydrocarbon or the mixture of alicyclic hydrocarbon and aliphatic hydrocarbon for improving the solubility of the modified dye in the solvent. The aliphatic alcohol is used in an amount up to 30% by weight, based on the weight of the solvent. Examples of such aliphatic alcohols are:

1. monohydric aliphatic alcohols such as ethyl alcohol, n-propyl alcohol, isopropyl alcohol, octyl alcohol, lauryl alcohol, cetyl alcohol, etc., and (2) dihydric aliphatic alcohols such as ethyleneglycol, propyleneglycol, 1,3-butyleneglycol 1,4-butyleneglycol, 1,6-hexyleneglycol, 2,5-hexyleneglycol, 3,4-hexyleneglycol, dipropyleneglycol, polypropyleneglycols having up to 100 carbon atoms, etc.

The resinous binder to be used in the invention, which assures satisfactory adhesion of the ink on the drawing or writing surface, includes various natural or synthetic resins heretofore used in marking pen inks. Typical of resinous binders are:

1. Rosin derivatives: pentaerythritol-rosin ester, pentaerythritol-hydrogenated rosin ester, ester gum, hydrogenated rosin, maleinized rosin, etc.

2. Petroleum resins: coumarone-indene resin, polyolefin, etc.

3. Alkyd resins: alkyd resins modified with drying oil or rosin, phenolated alkyd resin, styrenated alkyd resin, etc.

Among these resins, preferable are pentaerythritol-rosin ester, pentaerythritol-hydrogenated rosin ester, ester gum, hydrogenated rosin, maleinized rosin and polyolefin.

The concentration of the modified dye and resinous binder in the present ink composition varies widely with the kind of modified dye and alicyclic hydrocarbon solvent used, etc. Usually, the concentration of modified dye is in the range of 5 to 20%, preferably 5 to 15% by weight and that of resinous binder is in the range of 5 to 35%, preferably 10 to 20% by weight, based on the total weight of the ink composition.

The ink composition of this invention is prepared by adding the modified dye previously prepared as above to an alicyclic hydrocarbon solvent or solvent mixture of alicyclic hydrocarbon and aliphatic hydrocarbon along with the resinous binder and stirring the mixture at a temperature from about 20° to about 70°C to completely dissolve the modified dye and the resinous binder in the solvent. Alternatively, the ink composition of this invention is prepared by adding a dye, resinous binder and organic ammonium compound or acid compound to a solvent at the same time or in suitable sequence and stirring the mixture at a temperature from about 20° to 70°C to produce modified dye completely dissolved in the solvent along with the resinous binder. In the latter case, it is preferable to prepare the ink composition by dissolving the resinous binder, the dye and the organic ammonium compound or acid compound in sequence in order to increase the solubility of the modified dye to the alicyclic hydrocarbon solvent. To the ink composition of the present invention can be added further one or more dyes in order to change the color tone.

To clarify the features of this invention, examples are given below in which parts are all by weight.

EXAMPLE 1

Predetermined amounts of dyes having $-CO_2M$ and/or $-SO_3M$ group and quaternary ammonium chlorides (I) shown in Table 9 below were respectively added to 100 parts of isopropyl alcohol, and the mixtures were stirred at 40° to 50°C for about 20 minutes and the resultant precipitates in the mixture were filtered off. After repeatedly washed with water and dried, the precipitates were subjected to extraction with 100 parts of toluene. When the toluene was evaporated off under a reduced pressure, purified modified dyes were obtained as shown in Table 9 below, all of which were insoluble in water and soluble in alicyclic hydrocarbon solvent and the solvent mixture of alicyclic hydrocarbon and aliphatic hydrocarbon and had the same color as the original dyes.

Table 9

| | Dye | | Quaternary ammonium chloride | | Amount of modified |
|---|---|---|---|---|---|
| No. | Name*1 | Amount used (part) | Comp. No.*2 | Amount used (part) | dye obtained (part) |
| 1 | A.Y. 29 | 6 | 4 | 8 | 12 |
| 2 | D.Blu.22 | 8 | 11 | 5 | 11.5 |
| 3 | D.V. 51 | 8 | 14 | 6 | 12 |
| 4 | D.Br.44 | 12 | 17 | 7 | 17 |
| 5 | A.Blu.43 | 8 | 19 | 6 | 12 |
| 6 | D.R. 39 | 9 | 37 | 7 | 15 |
| 7 | A.R. 92 | 4 | 23 | 7 | 10 |
| 8 | A.R. 52 | 6 | 26 | 7 | 12 |
| 9 | A.R. 42 | 7 | 27 | 8 | 13 |
| 10 | A.R.186 | 9 | 29 | 6 | 13 |
| 11 | A.Bla.17 | 12 | 12 | 12 | 20 |

Note:
*1 "A.Y.", "D.Blu.", "D.V.", "D.Br.", "A.Blu.", "D.R.", "A.R." and "A.Bla." respectively stand for "Acid Yellow", "Direct Blue", "Direct Violet", "Direct Brown", "Acid Blue", "Direct Red", "Acid Red" and "Acid Black".
*2 Compound Nos. 4 to 37 respectively correspond to compound Nos. 4 to 37 attached to the examples of quaternary ammonium halides shown in Table 1 before.

Then predetermined amounts of the modified dyes obtained as above and resinous binder were added to predetermined amounts of solvents to obtain the ink compositions as shown in Table 10 below.

Table 10

| No. | Amount of modified dye used (part) | Resinous binder Kind | Amount used (part) | Solvent Kind | Amount used (part) | Color of the ink composition obtained |
|---|---|---|---|---|---|---|
| 1 | 9 | A*¹ | 16 | Dimethylcyclohexane<br>Butylcyclohexane | 75<br>60 | Yellow |
| 2 | 16 | B*² | 17 | Ethyl alcohol | 7 | Blue |
| 3 | 16 | C*³ | 17 | Isopropylcyclohexane<br>Methylethylcyclohexane | 67<br>61 | Reddish purple |
| 4 | 20 | D*⁴ | 14 | Hexyleneglycol | 5 | Yellowish brown |
| 5 | 15 | C*³ | 18 | Isopropylcyclohexene<br>Butylcyclohexene | 67<br>57 | Blue |
| 6 | 17 | A*¹ | 18 | Ethyl alcohol<br>Ethylcyclohexene | 8<br>15 | Bluish red |
| 7 | 28 | A*¹ | 19 | Petroleum spirit<br>Dimethylcyclohexene | 40<br>16 | Bluish red |
| 8 | 20 | E*⁵ | 16 | Ligroin<br>Isopropyl alcohol | 40<br>8 | Bluish red |
| 9 | 18 | F*⁶ | 15 | Butylcyclohexane | 67 | Red |
| 10 | 20 | B*² | 18 | Ethylbutylcyclohexane | 62 | Crimson |
| 11 | 25 | C*³ | 16 | Ethylcyclohexane | 59 | Reddish black |

Note:
*¹Pentaerythritol-rosin ester, "Pentaester", trademark, product of Tokushima Seiyu Co., Ltd., Japan.
*²Hydrogenated rosin, "Spaybelite", trademark, product of Hercules Powder Co., U.S.A.
*³Polyolefin, "Nisseki Neopolymer 120", trademark, product of Nippon Oil Co., Ltd., Japan.
*⁴Polyolefin, "Nisseki Neopolymer 140", trademark, product of Nippon Oil Co., Ltd., Japan.
*⁵Pentaerythritol-hydrogenated rosin ester, "Pentaester H", trademark, product of Tokushima Seiyu Co., Ltd., Japan.
*⁶Ester gum, "Pensel KK", trademark, product of Arakawa Rinsan Kagaku Kogyo Kabushiki Kaisha, Japan.

Every ink composition obtained as above tinctured a drawing surface satisfactorily in a deep color, was weak in odor, produced hardly any stimulation on the skin, and no color transfer was found on paper which was held in intimate contact with the drawing surface for a long period of over one month.

EXAMPLE 2

To various solvents kept at a temperature of about 70°C were added resinous binders with stirring, and further organic ammonium compounds represented by the formula (I) before were added slowly with stirring to effect complete solution. Subsequently, dyes were added slowly to the resulting solutions, followed by stirring for one and a half hours and then by cooling to room temperature. The filtration of insoluble precipitates gave ink compositions of the present invention as shown in Table 11 below.

Every ink composition obtained as above had distinguished properties the same as the compositions obtained in Example 1.

EXAMPLE 3

Predetermined amounts of dyes and pyridinium chlorides as shown in Table 12 below were respectively added to 100 parts of organic solvents, and the mixtures were stirred at about 50°C for about 15 minutes and the resultant precipitates in the mixture were filtered off. After repeatedly washed with water and dried, the precipitates were subjected to extraction with 100 parts of toluene. Purified modified dyes were obtained when the toluene was evaporated off under a reduced pressure. The modified dyes thus obtained were insoluble in water and soluble in a high concentration in alicyclic hydrocarbon solvent and solvent mix- Table 11

| No. | ammonium Dye Name*¹ | Amount used (part) | Organic Resinous compound Comp.*² No. | Amount used (part) | binder Kind*³ | Amount used (part) | Solvent Kind | Amount used (part) | Color of the ink composition obtained |
|---|---|---|---|---|---|---|---|---|---|
| 12 | A.Br. 20 | 10 | 8 | 13 | E | 18 | Ethylcyclohexane<br>Refined gasoline | 20<br>39 | Brown |
| 13 | A.V.22 | 8 | 13 | 6 | B | 15 | Ethylbutylcyclohexane<br>Ethyl alcohol | 60<br>11 | Reddish purple |
| 14 | D.G. 1 | 12 | 15 | 7 | A | 15 | Pentylcyclohexene<br>Dipropyleneglycol | 62<br>4 | Green |
| 15 | A.R.111 | 8 | 41 | 8 | F | 17 | Ethylcyclohexane<br>Propyleneglycol | 62<br>5 | Red |
| 16 | A.O.41 | 9 | 31 | 10 | B | 16 | Dimethylcyclohexane<br>Tripropyleneglycol | 60<br>5 | Yellowish orange |

Note:
*¹"A.Br.", "A.V.", "D.G.", "A.R." and "A.O." respectively stand for "Acid Brown", "Acid Violet", "Direct Green", "Acid Red" and "Acid Orange".
*²Compound Nos. 8 to 41 respectively correspond to compound Nos. 8 to 41 attached to the examples of quaternary ammonium halides shown in Table 1 before.
*³A, B, E and F are the same as in Table 10 of Example 1.

ture of alicyclic hydrocarbon and aliphatic hydrocarbon and had the same colors as the original dyes.

pounds represented by the formulas (II), (III) and (IV) before and dyes were added slowly with stirring to Table 12

| No. | Dye Name*¹ | Amount used (part) | Pyridinium chloride Comp. No. *² | Amount used (part) | Organic solvent | Amount of modified dye obtained (part) |
|---|---|---|---|---|---|---|
| 17 | A.R. 138 | 10 | 46 | 5 | Methyl cellosolve | 13.5 |
| 18 | D.V. 9 | 6 | 47 | 6 | Ethyl cellosolve | 11 |
| 19 | D.O. 10 | 7 | 51 | 8 | Isopropyl alcohol | 13 |
| 20 | D.Br. 95 | 9 | 55 | 12 | methyl ethyl ketone | 18 |
| 21 | A.R. 87 | 6 | 67 | 5 | Methyl isobutyl ketone | 9.5 |
| 22 | D.Bla.19 | 10 | 57 | 10 | Ethyl alcohol | 18 |
| 23 | A.Blu. | 8 | 60 | 7 | Isopropyl alcohol | 13 |
| 24 | A.Blu.93 | 8 | 66 | 10 | Methyl cellosolve | 17 |
| 25 | A.Blu.83 | 7 | 64 | 5 | Ethyl cellosolve | 10 |

Note:
*¹"A.R.", "D.V.", "D.O.", "D.Br.", "D.Bla." and "D.Blu." respectively stand for "Acid Red", "Direct Violet", "Direct Orange", "Direct Brown", "Direct Black" and "Direct Blue".
*²Compound Nos. 46 to 66 respectively correspond to compounds Nos. 46 to 66 attached to the examples of pyridinium halides shown in Table 2 before.

Ink compositions of the present invention were prepared by dissolving the modified dyes obtained as above and resinous binders in solvents as shown in Table 13.

effect complete solution. The resulting solutions were further stirred for about 2 hours and then allowed to cool to room temperature. Ink compositions of the present invention were obtained by filtering out the Table 13

| No. | Amount of modified dye used (part) | Resinous binder Kind*¹ | Amount used (part) | Solvent Kind | Amount used (part) | Color of the ink composition obtained |
|---|---|---|---|---|---|---|
| 17 | 15 | A | 17 | Isopropylcyclohexane | 40 | Red |
|  |  |  |  | Aliphatic hydrocarbon*² | 25 |  |
|  |  |  |  | Tripropyleneglycol | 3 |  |
| 18 | 18 | E | 18 | Butylcyclohexane | 60 | Reddish purple |
|  |  |  |  | Ethyl alcohol | 4 |  |
| 19 | 18 | B | 19 | Ethylcyclohexane | 60 | Yellowish orange |
|  |  |  |  | Dipropyleneglycol | 3 |  |
| 20 | 25 | C | 19 | Butylcyclohexane | 56 | yellowish brown |
| 21 | 17 | D | 17 | Ethylcyclohexane | 66 | Red |
| 22 | 25 | A | 18 | Dimethylcyclohexane | 52 | Greenish black |
|  |  |  |  | Hexyleneglycol | 5 |  |
| 23 | 18 | E | 16 | Isopropylcyclohexane | 39 | Green |
|  |  |  |  | Aliphatic hydrocarbon*² | 20 |  |
|  |  |  |  | Isopropyl alcohol | 7 |  |
| 24 | 19 | E | 17 | Butylcyclohexene | 47 | Green |
|  |  |  |  | n-Octane | 17 |  |
| 25 | 15 | B | 19 | Isopropylcyclohexane | 41 | Reddish green |
|  |  |  |  | n-Octene | 20 |  |
|  |  |  |  | Dipropyleneglycol | 5 |  |

Note:
*¹A, B, C, D and E are the same as in Table 10 in Example 1.
*²"Isoper E", trademark, product of Esso Petrochemical Co., Ltd., Japan.

EXAMPLE 4

Resinous binders were added to solvents at about 50°C with stirring and further organic ammonium cominsoluble precipitates, as shown in Table 14 below.

Table 14

| No. | Dye Name*¹ | Amount used (part) | Formula | Organic ammonium compound Comp.*² No. | Amount used (part) | Resinous binder Kind*³ | Amount used (part) | Solvent Kind | Amount used (part) | Color of the ink composition obtained |
|---|---|---|---|---|---|---|---|---|---|---|
| 26 | D.Br. 1A | 10 | II | 53 | 12 | E | 17 | Dimethylcyclohexane | 61 | Reddish brown |
| 27 | A.Y.17 | 10 | II | 70 | 14 | D | 17 | Butylcyclohexane | 52 | Greenish yellow |
|  |  |  |  |  |  |  |  | Ethyl alcohol | 7 |  |
| 28 | A.Blu. 41 | 9 | II | 63 | 8 | A | 19 | Pentylcyclohexene | 57 | Green |
|  |  |  |  |  |  |  |  | Isopropyl alcohol | 7 |  |

Table 14-continued

| Dye | | | Organic ammonium compound | | Resinous binder | | Solvent | | Color of the ink composition obtained |
|---|---|---|---|---|---|---|---|---|---|
| No. | Name*[1] | Amount used (part) | Formula | Comp.*[2] No. | Amount used (part) | Kind*[3] | Amount used (part) | Kind | Amount used (part) | |
| 29 | A.V.43 | 9 | III | 72 | 7 | C | 17 | Ethylcyclohexane | 45 | Violet |
| | | | | | | | | Propylcyclohexene | 22 | |
| 30 | A.R.26 | 9 | IV | 74 | 6 | A | 15 | Refined gasoline | 45 | Red |
| | | | | | | | | Ethylcyclohexane | 25 | |

Note:
*[1]"D.Br.", "A.Y.", "A.Blu.", "A.V." and "A.R." respectively stand for "Direct Brown", "Acid Yellow", "Acid Blue", "Acid Violet" and "Acid Red".
*[2]Compound Nos. 53 to 74 respectively correspond to those attached to the examples of organic ammonium compounds shown in Tables 2, 3, and 4 before.
*[3]A, C, D and E are the same as in Table 10 of Example 1.

EXAMPLE 5

Modified dyes were obtained from dyes and acid salts of amines [formula (V)] as shown in Table 15 by the similar procedure as in Example 3. All of the modified dyes obtained had the same colors as the original dyes and were soluble in high concentration in alicyclic hydrocarbon solvent and solvent mixture of alicyclic hydrocarbon and aliphatic hydrocarbon, but were hardly soluble in water.

Table 15

| Dye | | | Amine salt | | | Amount of modified dye obtained (part) |
|---|---|---|---|---|---|---|
| No. | Name*[1] | Amount used (part) | Comp.*[2] No. | Amount used (part) | Organic solvent | |
| 31 | A.Blu.40 | 6 | 89 | 7 | Ethyl alcohol | 12 |
| 32 | A.V. 43 | 7 | 104 | 6 | Ethyl alcohol | 11.5 |
| 33 | A.Blu.15 | 6 | 111 | 3 | Isopropyl alcohol | 8 |
| 34 | A.Blu.74 | 6 | 85 | 8 | Ethyl alcohol | 12 |
| 35 | D.Y. 28 | 8 | 86 | 8 | Ethyl cellosolve | 14 |
| 36 | A.R. 14 | 6 | 89 | 8 | Isopropyl alcohol | 12 |
| 37 | A.R. 138 | 13 | 75 | 5 | Ethyl alcohol | 16.5 |
| 38 | A.Y. 36 | 7 | 77 | 4 | Ethyl alcohol | 10 |
| 39 | A.Blu.117 | 6 | 81 | 4 | Ethyl cellosolve | 9 |
| 40 | A.Br. 4 | 9 | 82 | 10 | Ethyl cellosolve | 15 |
| 41 | A.R. 154 | 8 | 94 | 7 | Methyl cellosolve | 13 |
| 42 | A.V. 49 | 9 | 100 | 5 | methyl ethyl ketone | 13 |
| 43 | A.R. 51 | 7 | 93 | 4 | Methyl isobutyl ketone | 10 |

Note:
*[1]"A.Blu.", "A.V.", "D.Y.", "A.R", "A.Y." and "A.Br." respectively stand for "Acid Blue", "Acid Violet", "Direct Yellow", "Acid Red", and "Acid Brown".
*[2]Compound Nos. 75 to 111 respectively correspond to those attached to the examples of amines salts shown in Table 5 before.

Ink compositions of the present invention were prepared by dissolving the modified dyes thus obtained and resinous binders in solvents as shown in Table 16 below.

Table 16

| No. | Amount of modified dye used (part) | Resinous binder | | Solvent | | Color of the ink composition obtained |
|---|---|---|---|---|---|---|
| | | Kind*[1] | Amount used (part) | Kind | Amount used (part) | |
| 31 | 17 | F | 17 | Ethylcyclohexane | 50 | Blue |
| | | | | Aliphatic hydrocarbon*[2] | 6 | |
| 32 | 18 | F | 14 | Ethylcyclohexene | 17 | Blue |
| | | | | Ligroin | 50 | |
| 33 | 15 | G | 14 | Butylcyclohexene | 40 | Blue |
| | | | | n-Heptane | 25 | |
| | | | | Ethyl alcohol | 6 | |
| 34 | 20 | A | 18 | Isopropylcyclohexane | 62 | Blue |
| | | | | Dimethylcyclohexane | 40 | |
| 35 | 18 | E | 19 | Refined gasoline | 23 | Yellow |
| | | | | Ethylcyclohexane | 50 | |
| 36 | 20 | F | 14 | Aliphatic hydrocarbon*[2] | 12 | Magenta |
| | | | | Dipropyleneglycol | 4 | |
| 37 | 17 | C | 18 | Dimethylcyclohexane | 65 | Red |
| | | | | Ethylcyclohexane | 65 | |
| 38 | 16 | B | 18 | | | Reddish yellow |
| | | | | Isopropyl alcohol | 6 | |
| | | | | Ethylbutylcyclohexane | 63 | |
| 39 | 17 | E | 16 | | | Purplish blue |
| | | | | Propyleneglycol | 4 | |
| 40 | 25 | D | 14 | Butylcyclohexane | 61 | Reddish brown |
| | | | | Isopropylcyclohexane | 60 | |
| 41 | 18 | C | 16 | | | Magenate |
| | | | | Ethyl alcohol | 6 | |

Table 16-continued

| No. | Amount of modified dye used (part) | Resinous binder Kind*¹ | Amount used (part) | Solvent Kind | Amount used (part) | Color of the ink composition obtained |
|---|---|---|---|---|---|---|
| 42 | 15 | A | 18 | Dimethylcyclohexane | 63 | Violet |
|  |  |  |  | Hexyleneglycol | 4 |  |
| 43 | 14 | E | 16 | Isopropylcyclohexane | 50 | Orange red |
|  |  |  |  | n-Heptane | 15 |  |
|  |  |  |  | Ethyl alcohol | 5 |  |

Note:
*¹A, B, C, D, E and F are the same as in Table 10 of Example 1. G is an alkyd resin modified with soybean oil.
*²"Isoper E" the same as in Table 13 of Example 3.

EXAMPLE 6

Resinous binders were added to solvents at about 60°C with stirring and further organic amine salts represented by the formula (V) before were added with stirring to effect complete solution. Subsequently, dyes were added to the resulting solutions, followed by stirring for an hour and then by cooling to room temperature. Ink compositions of the present invention were obtained by filtering out the insoluble precipitates from the solution as given in Table 17 below.

mixtures were stirred at about 40°C for 30 minutes and the resulting precipitates in the mixtures were filtered off. After repeatedly washed with water and dired, the precipitates thus filtered off were subjected to extraction with 100 parts of toluene. Purified modified dyes as shown in Table 18 were obtained by evaporating off the toluene under a reduced pressure. The modified dyes thus obtained were hardly soluble in water but soluble in a high concentration in an alicyclic hydrocarbon and a mixture of alicyclic hydrocarbon and aliphatic hydrocarbon, and had the same colors as the original dyes.

Table 17

| No. | Dye Name*¹ | Amount used (part) | Amine salt Comp.*² No. | Amount used (part) | Resinous binder Kind*³ | Amount used (part) | Solvent Kind | Amount used (part) | Color of the ink composition obtained |
|---|---|---|---|---|---|---|---|---|---|
| 44 | A.Blu.120 | 7 | 108 | 4 | B | 16 | Dimethylcyclohexane | 65 | Greenish blue |
|  |  |  |  |  |  |  | Isopropyl alcohol | 8 |  |
| 45 | A.R. 6 | 9 | 88 | 6 | B | 18 | Butylcyclohexene | 60 | Purplish red |
|  |  |  |  |  |  |  | Isopropyl alcohol | 7 |  |
| 46 | A.R. 26 | 9 | 90 | 9 | A | 18 | Isopropylcyclohexane | 40 | Red |
|  |  |  |  |  |  |  | n-Heptane | 19 |  |
|  |  |  |  |  |  |  | Ethyl alcohol | 5 |  |
| 47 | A.V. 15 | 8 | 83 | 7 | A | 19 | Butylcyclohexane | 66 | Violet |

Note:
*¹"A.Blu.", "A.R." and "A.V." respectively stand for "Acid Blue", "Acid Red" and "Acid Violet".
*²Composition Nos. 83 to 108 respectively correspond to those attached to the examples of amine salts shown in Table 5 before.
*³A and B are the same as in Table 10 of Example 1.

Table 18

| No. | Dye Name*¹ | Amount used (part) | Alkali salt of acid compound Formula | Comp. No.*² | Amount used (part) | Amount of modified dye obtained (part) |
|---|---|---|---|---|---|---|
| 48 | B.Y. 10 | 10 | VI | 115 | 6 | 15 |
| 49 | B.R. 12 | 10 | VI | 125 | 9 | 18 |
| 50 | B.Blu.7 | 11 | VI | 133 | 7 | 18 |
| 51 | B.R. 1 | 9 | VI | 136 | 7 | 15 |
| 52 | B.Blu.5 | 12 | VI | 138 | 10 | 20 |
| 53 | B.V. 3 | 8 | VI | 139 | 6 | 12 |
| 54 | B.R.13 | 10 | VI | 143 | 8 | 16.5 |
| 55 | B.Y. 2 | 10 | VII | 148 | 12 | 20.5 |
| 56 | B.O. 2 | 5 | VII | 153 | 10 | 14 |
| 57 | B.V. 1 | 7 | VIII | 155 | 14 | 20 |
| 58 | B.G. 4 | 10 | IX | 157 | 7 | 15 |
| 59 | B.Blu.25 | 12 | X | 161 | 5 | 15.5 |
| 60 | B.Blu.3 | 8 | X | 163 | 10 | 16.5 |

Note:
*¹"B.Y.", "B.R.","B.Blu.", "B.V.", "B.O." and "B.G." respectively stand for " Basic Yellow", Basic red", "Basic Blue", "Basic Violet", "Basic Orange" and "Basic Green".
*²Compound Nos. 115 to 163 respectively correspond to those attached to the examples of compounds represented by the formulas (VI) to (X) before.

EXAMPLE 7

Predetermined amounts of basic dyes and alikali salts of acid compound represented by the formulas (VI), (VII), (VIII), (IX) and (X) as shown in Table 18 below were respectively added to 100 parts of water and the Ink compositions of the present invention were prepared by dissolving the modified dyes thus obtained and resinous binders in solvents as shown in Table 19 below.

Table 19

| No. | Amount of modified dye used (part) | Resinous binder Kind*[1] | Resinous binder Amount used (part) | Solvent Kind | Solvent Amount used (part) | Color of the ink composition obtained |
|---|---|---|---|---|---|---|
| 48 | 18 | C | 18 | Ethylcyclohexane | 64 | Reddish yellow |
| 49 | 20 | A | 15 | Methylethylcyclohexane | 65 | Purplish red |
| 50 | 18 | E | 17 | Dimethylcyclohexane<br>n-Heptane<br>Isopropyl alcohol | 40<br>18<br>7 | Blue |
| 51 | 17 | F | 14 | Ethylbutylcyclohexane<br>Dipropyleneglycol | 65<br>4 | Scarlet |
| 52 | 19 | F | 17 | Ethylcyclohexane<br>Propyleneglycol | 60<br>4 | Greenish blue |
| 53 | 18 | B | 16 | Butylcyclohexene<br>Ethyl alcohol | 61<br>5 | Purple |
| 54 | 18 | A | 17 | Isopropylcyclohexane | 65 | Pinky yellow |
| 55 | 21 | D | 16 | Butylcyclohexene | 63 | Yellow |
| 56 | 24 | C | 17 | Ethylcyclohexene<br>Aliphatic hydrocarbon*[2] | 47<br>12 | Yellowish Brown |
| 57 | 25 | B | 19 | Dimethylcyclohexane<br>Isopropyl alcohol | 61<br>7 | Purple |
| 58 | 18 | F | 14 | Methylethylcyclohexane | 65 | Bluish green |
| 59 | 16 | H | 12 | Dimethylcyclohexane | 72 | Green |
| 60 | 16 | E | 19 | Ethylcyclohexane<br>Aliphatic hydrocarbon*[2] | 48<br>17 | Greenish blue |

Note:
*[1] "A", "B", "C", "D", "D" and "F" are the same as in Table 10 of Example 1. "H" is an alkyd resin modified with rosin.
*[2] "Isoper E", the same as in Table 13 of Example 3.

EXAMPLE 8

Resinous binders were added to solvents at 70°C with stirring and further alkali salts of acid compounds represented by the formulas (VI) and (X) before were added with stirring to effect complete solution. Subsequently, basic dyes were added to the resulting solution, followed by stirring for two hours and then by cooling to room temperature. Ink compositions of the present invention were obtained by filtering out the insoluble precipitates from the solution as shown in Table 20 below.

modified dye, all % weights being based on the weight of the total composition, said modified dye being at least one species selected from the group consisting of a reaction product obtained by reacting a disazo or anthraquinone dye having at least one group of —$CO_2M$ and —$SO_3M$ in the molecule wherein M is an alkali metal with an organic ammonium compound and a reaction product obtained by reacting a basic dye having a positively charged nitrogen, sulfur or oxygen atom in the molecular selected from the group consisting of azo, diphenylmethane, triarylmethane, xanthene, acridiene, methine or polymethine, thiazole, azine, Table 20

| No. | Dye Name*[1] | Dye Amount used (part) | Alkali salt of acid compound Formula | Alkali salt of acid compound Comp. No.*[2] | Alkali salt of acid compound Amount used (part) | Resinous binder Kind*[3] | Resinous binder Amount used (part) | Solvent Kind | Solvent Amount used (part) | Color of the ink composition obtained |
|---|---|---|---|---|---|---|---|---|---|---|
| 61 | B.Y.11 | 10 | VI | 115 | 8 | A | 18 | Isopropylcyclohexane<br>Ethyl alcohol | 57<br>7 | Yellow |
| 62 | B.Blu.26 | 10 | VI | 128 | 6 | E | 19 | Butylcyclohexane<br>Aliphatic hydro-*[4] carbon<br>Hexyleneglycol | 40<br>20<br>5 | Blue |
| 63 | B.V.10 | 10 | X | 167 | 8 | A | 18 | Butylcyclohexane<br>n-Heptane<br>Dipropyleneglycol | 45<br>15<br>4 | Deep violet |

Note:
*[1] "B.Y.", "B.Blu." and "B.V." respectively stand for "Basic Yellow", "Basic Blue" and "Basic Violet".
*[2] Composition Nos. 115, 128 and 167 respectively correspond to those attached to the examples of compound represented by the formula (VI) and (X) before.
*[3] "A" and "E" are the same as in Table 10 of Example 1.
*[4] "Isoper E", the same as in Table 13 of Example 3.

What we claim is:
1. In an ink composition for use in marking pens of the type composed of a dye, a binder and a solvent, the improvement which comprises the solvent being selected from the group consisting of the hexane series and having dissolved therein 5 to 35% by weight of the resinous binder and about 5 to 20% by weight of a modified dye, all % weights being based on the weight of the total composition, said modified dye being at least one species selected from the group consisting of a reaction product obtained by reacting a disazo or anthraquinone dye having at least one group of —$CO_2M$ and —$SO_3M$ in the molecule wherein M is an alkali metal with an organic ammonium compound and a reaction product obtained by reacting a basic dye having a positively charged nitrogen, sulfur or oxygen atom in the molecular selected from the group consisting of azo, diphenylmethane, triarylmethane, xanthene, acridiene, methine or polymethine, thiazole, azine, oxazine, thiazine, quinoline and authraquinone dyes with an acid compound: said ammonium compound being represented by the formula

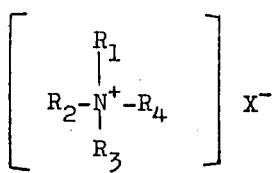

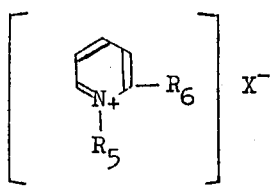

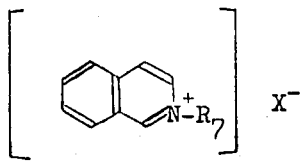

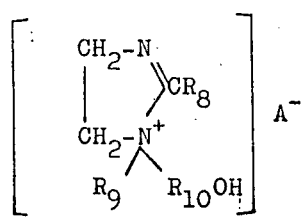

or

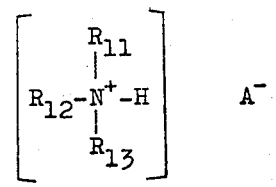

wherein $R_1$, $R_2$, $R_3$ and $R_4$ are respectively a saturated or unsaturated hydrocarbon radical having 1 to 40 carbon atoms, a radical of a saturated or unsaturated hydrocarbon bonded to a saturated or unsaturated hydrocarbon by a divalent group of —O—, —S—, —COO—, —CONH— or —NH—, the total carbon number of both hydrocarbons bonded being in the range of 2 to 40, or

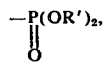

R' being an alkyl or alkenyl having 1 to 20 carbon atoms, provided that at least one of $R_1$, $R_2$, $R_3$ and $R_4$ has a carbon number of not lower than 4 and the total carbon number of $R_1$, $R_2$, $R_3$ and $R_4$ is in the range of 7 to 55; $R_5$ is a saturated or unsaturated hydrocarbon radical having 4 to 40 carbon atoms, a radical of a saturated or unsaturated hydrocarbon bonded to a saturated or unsaturated hydrocarbon by a divalent group of —O—, —S—, —COO—, —CONH— or —NH—, the total carbon number of both hydrocarbons bonded being in the range of 4 to 40, or

R' being an alkyl or alkenyl having 4 to 20 carbon atoms; $R_6$ is hydrogen atom, methyl or ethyl group; $R_7$ is an aliphatic hydrocarbon radical having 4 to 22 carbon atoms; $R_8$ and $R_9$ are respectively a hydrocarbon radical having 1 to 10 carbon atoms; $R_{10}$ is methyl ethyl butyl or propyl group; $R_{11}$, $R_{12}$ and $R_{13}$ are respectively a hydrogen atom, a hydrocarbon radical having 1 to 40 carbon atoms, a radical of a hydrocarbon bonded to a hydrocarbon by a divalent group of —O—, —S—, —COO—, —CONH— or —NH—, the total carbon number of both hydrocarbons bonded being in the range of 2 to 40, or

R' being an alkyl or alkenyl having 1 to 20 carbon atoms, provided that at least one of $R_{11}$, $R_{12}$ and $R_{13}$ is a radical having a carbon number of not lower than 4 and the total carbon number of $R_{11}$, $R_{12}$ and $R_{13}$ is in the range of 4 to 50; X is halogen atom and; A is an acid residue; and said acid compound being represented by the formula $R_{14}Y$,

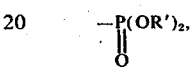

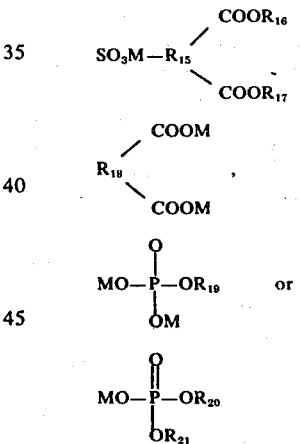

wherein $R_{14}$ and $R_{19}$ are respectively a saturated or unsaturated aliphatic hydrocarbon radical having 7 to 22 carbon atoms, an aromatic hydrocabon radical having 10 to 28 carbon atoms or a saturated or unsaturated alicyclic hydrocarbon radical having 10 to 28 carbon atoms; $R_{15}$ is a saturated aliphatic hydrocarbon radical having 2 to 14 carbon atoms; $R_{16}$, $R_{17}$, $R_{20}$ and $R_{21}$ are respectively a saturated or unsaturated aliphatic hydrocarbon radical having 4 to 22 carbon atoms; $R_{18}$ is a saturated aliphatic hydrocarbon radical having 4 to 18 carbon atoms; M is an alkali metal or ammonium; Y is a —$CO_2M$, —$SO_3M$ or —$OSO_3M$ group wherein M is the same as above.

2. The ink composition according to claim 1, wherein said organic ammonium compound is a compound represented by the formula

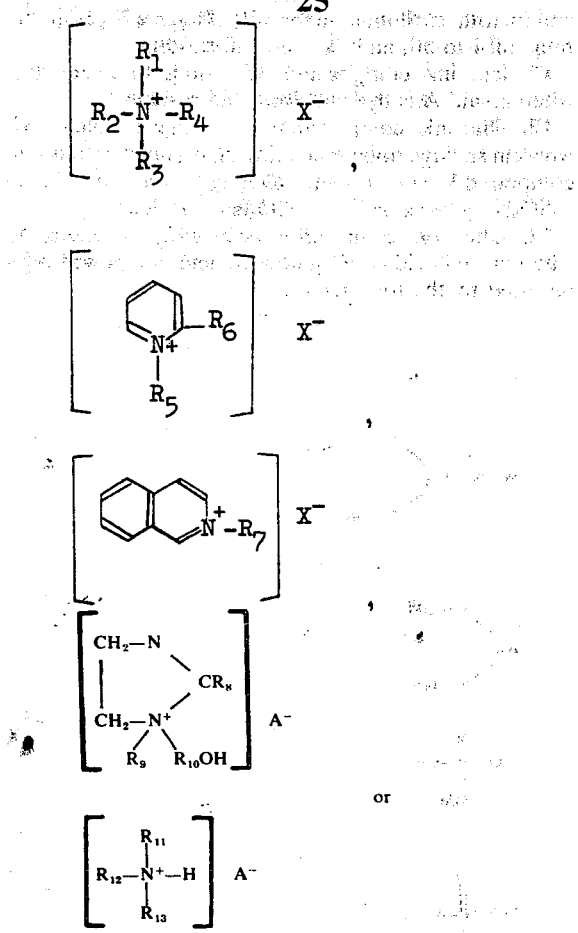

wherein $R_1$, $R_2$, $R_3$ and $R_4$ are respectively a saturated or unsaturated hydrocarbon radical having 1 to 40 carbon atoms, a radical of a saturated or unsaturated hydrocarbon bonded to a saturated or unsaturated hydrocarbon by a divalent group of —O—, —S—, —COO—, —CONH— or —NH—, the total carbon number of both hydrocarbons bonded being in the range of 2 to 40, or

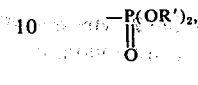

$R'$ being an alkyl or alkenyl having 1 to 20 carbon atoms, provided that at least one of $R_1$, $R_2$, $R_3$ and $R_4$ has a carbon number of not lower than 4 and the total carbon number of $R_1$, $R_2$, $R_3$ and $R_4$ is in the range of 7 to 55; $R_5$ is a saturated or unsaturated hydrocarbon radical having 4 to 40 carbon atoms, a radical of a saturated or unsaturated hydrocarbon bonded to a saturated or unsaturated hydrocarbon by a divalent group of —O—, —S—, —COO—, —CONH— or —NH—, the total carbon number of both hydrocarbons bonded being in the range of 4 to 40, or

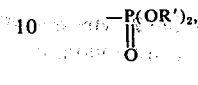

$R'$ being an alkyl or alkenyl having 4 to 20 carbon atoms; $R_6$ is hydrogen atom, methyl or ethyl group; $R_7$ is an aliphatic hydrocarbon radical having 4 to 22 carbon atoms; $R_8$ and $R_9$ are respectively a hydrocarbon radical having 1 to 10 carbon atoms; $R_{10}$ is methyl, ethyl, butyl or propyl group; $R_{11}$, $R_{12}$ and $R_{13}$ are respectively a hydrogen atom, a hydrocarbon radical having 1 to 40 carbon atoms, a radical of a hydrocarbon bonded to a hydrocarbon by a divalent group of —O—, —S—, —COO—, —CONH— or —NH—, the total carbon number of both hydrocarbons bonded being in the range of 2 to 40, or

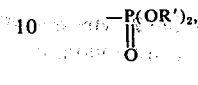

$R'$ being an alkyl or alkenyl having 1 to 20 carbon atoms, provided that at least one of $R_{11}$, $R_{12}$ and $R_{13}$ is a radical having a carbon number of not lower than 4 and the total carbon number of $R_{11}$, $R_{12}$ and $R_{13}$ is in the range of 4 to 50; X is halogen atom and; A is an acid residue.

3. The ink composition according to claim 2, wherein said organic ammonium compound is a quaternary ammonium compound represented by the formula

wherein $R_1$, $R_2$, $R_3$ and $R_4$ are respectively a saturated or unsaturated hydrocarbon radical having 1 to 40 carbon atoms, a radical of a saturated or unsaturated hydrocarbon bonded to a saturated or unsaturated hydrocarbon by a divalent group of —O—, —S—, —COO—, —CONH— or —NH—, the total carbon number of both hydrocarbons bonded being in the range of 2 to 40, or

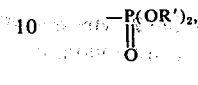

$R'$ being an alkyl or alkenyl having 1 to 20 carbon atoms, provided that at least one of $R_1$, $R_2$, $R_3$ and $R_4$ have a carbon number of not lower than 4 and the total carbon number of $R_1$, $R_2$, $R_3$ and $R_4$ is in the range of 7 to 55; and X is a halogen atom.

4. The ink composition according to claim 3, wherein said X is chlorine atom.

5. The ink composition according to claim 2, wherein said organic ammonium compound is a pyridinium compound represented by the formula

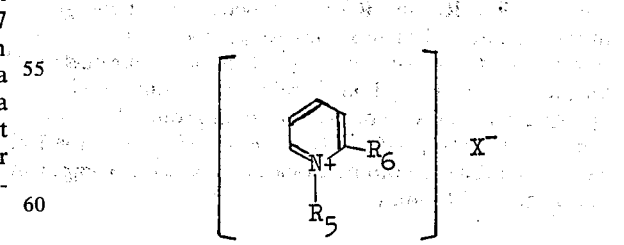

wherein $R_5$ is a saturated or unsaturated hydrocarbon radical having 4 to 40 carbon atoms, a radical of a saturated or unsaturated hydrocarbon bonded to a saturated or unsaturated hydrocarbon by a divalent group of —O—, —S—, —COO—, —CONH— or —NH—, the total carbon number of both hydrocarbons bonded being in the range of 4 to 40, or

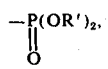

R' being an alkyl or alkenyl having 4 to 20 carbon atoms; and X is a halogen atom.

6. The ink composition according to claim 5, wherein said X is chlorine atom.

7. The ink composition according to claim 2, wherein said organic ammonium compound is a quinolinium compound represented by the formula

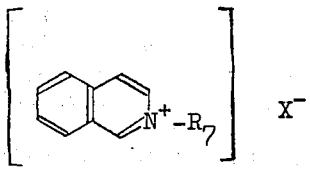

wherein $R_7$ is an aliphatic hydrocarbon radical having 4 to 22 carbon atoms and X is a halogen atom.

8. The ink composition according to claim 7, wherein said X is chloride atom.

9. The ink composition according to claim 2, wherein said organic ammonium compound is a imidazolinium compound represented by the formula

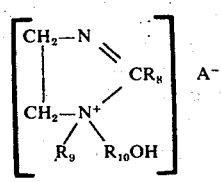

wherein $R_8$ and $R_9$ are respectively a hydrocarbon radical having 1 to 10 carbon atoms; $R_{10}$ is methyl, ethyl, propyl or butyl group; and A is an acid residue.

10. The ink composition according to claim 9, wherein A is chloride atom.

11. The ink composition according to claim 2, wherein said organic ammonium compound is a amine compound represented by the formula

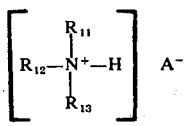

wherein $R_{11}$, $R_{12}$ and $R_{13}$ are respectively a hydrogen atom, a saturated or unsaturated hydrocarbon radical having 1 to 40 carbon atoms, a radical of a saturated or unsaturated hydrocarbon bonded to a saturated or unsaturated hydrocarbon by a divalent group of —O—, —S—, —COO—, —CONH— or —NH—, the total carbon number of both hydrocarbons bonded being in the range of 2 to 40, or

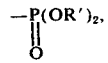

R' being an alkyl or alkenyl having 1 to 20 carbon atoms, provided that at least one of $R_{11}$, $R_{12}$ and $R_{13}$ is a radical having a carbon number of not lower than 4 and the total carbon number of $R_{11}$, $R_{12}$ and $R_{13}$ is in the range of 4 to 50; and A is an acid residue.

12. The ink composition according to claim 11, wherein said A is hydrochloric acid residue.

13. The ink composition according to claim 1, wherein said dye to be reacted with organic ammonium compound has one to two —$CO_2Na$ groups, one to two —$SO_3Na$ groups or both —$CO_2Na$ and $SO_3Na$ groups.

14. The ink composition according to claim 1, wherein said acid compound is an acid compound represented by the formula

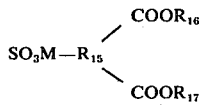

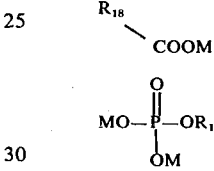

or

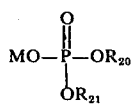

wherein $R_{14}$ and $R_{19}$ are respectively a saturated or unsaturated aliphatic hydrocarbon radical having 7 to 22 carbon atoms, an aromatic hydrocarbon radical having 10 to 28 carbon atoms or a saturated or unsaturated alicyclic hydrocarbon radical having 10 to 28 carbon atoms; $R_{15}$ is a saturated aliphatic hydrocarbon radical having 2 to 14 carbon atoms; $R_{16}$, $R_{17}$, $R_{20}$ and $R_{21}$ are respectively a saturated or unsaturated aliphatic hydrocarbon radical having 4 to 22 carbon atoms; $R_{18}$ is a saturated aliphatic hydrocarbon radical having 4 to 18 carbon atoms; M is an alkali metal or ammonium; Y is a —$CO_2M$, —$SO_3M$ or —$OSO_3M$ group wherein M is the same as above.

15. The ink composition according to claim 14, wherein said acid compound is an organic alkaline compound rep esented by the formula $R_{14}Y$ wherein $R_{14}$ is a saturated or unsaturated aliphatic hydrocarbon radical having 7 to 22 carbon atoms, an aromatic hydrocarbon radical having 10 to 28 carbon atoms or a saturated or unsaturated alicyclic hydrocarbon radical having 10 to 28 carbon atoms; and Y is a —$CO_2M$, —$SO_3M$ or —$OSO_3M$ group wherein M an alkali metal or ammonium.

16. The ink composition according to claim 15, wherein said M is sodium atom.

17. The ink composition according to claim 14, wherein said acid compound is an organic alkaline compound represented by the formula

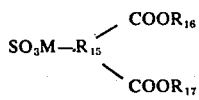

wherein $R_{15}$ is a saturated aliphatic hydrocarbon radical having 2 to 14 carbon atoms; $R_{16}$ and $R_{17}$ are respectively a saturated or unsaturated aliphatic hydrocarbon radical having 4 to 22 carbon atoms.

18. The ink composition according to claim 17, wherein said M is sodium atom.

19. The ink composition according to claim 14, wherein said acid compound is an organic alkaline compound represented by the formula

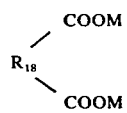

wherein $R_{18}$ is a saturated aliphatic hydrocarbon radical having 4 to 18 carbon atoms; and M is an alkali metal or ammonium.

20. The ink composition according to claim 19, wherein said M is sodium atom.

21. The ink composition according to claim 14, wherein said acid compound is a phosphoric ester represented by the formula

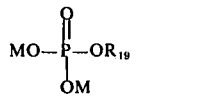

wherein $R_{19}$ is a saturated or unsaturated aliphatic hydrocarbon radical having 7 to 22 carbon atoms, an aromatic hydrocarbon radical having 10 to 28 carbon atoms or a saturated or unsaturated alicyclic hydrocarbon radical having 10 to 28 carbon atoms; and M is an alkali metal or ammonium.

22. The ink composition according to claim 21, wherein M is sodium atom.

23. The ink composition according to claim 14, wherein said acid compound is a dialkyl phosphoric ester represented by the formula

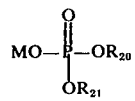

wherein $R_{20}$ and $R_{21}$ are respectively a saturated or unsaturated aliphatic hydrocarbon radical having 4 to 22 carbon atoms; and M is an alkali metal or ammonium.

24. The ink composition according to claim 23, wherein said M is sodium atom.

* * * * *